No. 889,272. PATENTED JUNE 2, 1908.
W. J. SWORDS.
HEAD GATE.
APPLICATION FILED SEPT. 30, 1907.
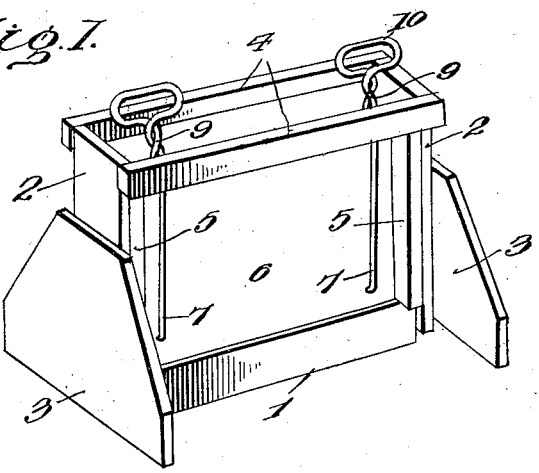
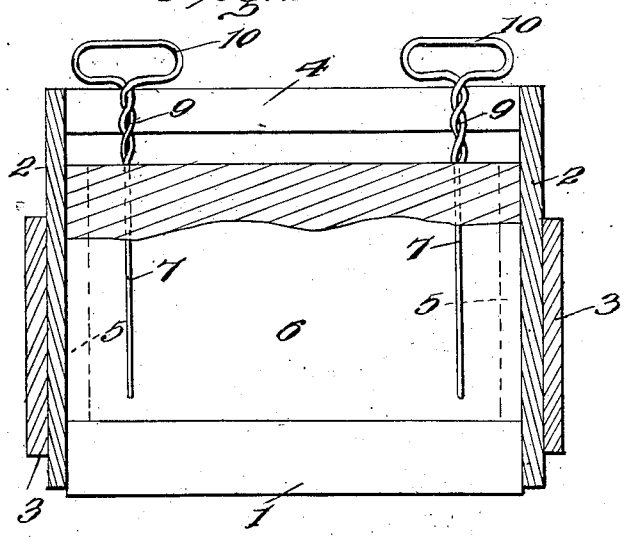
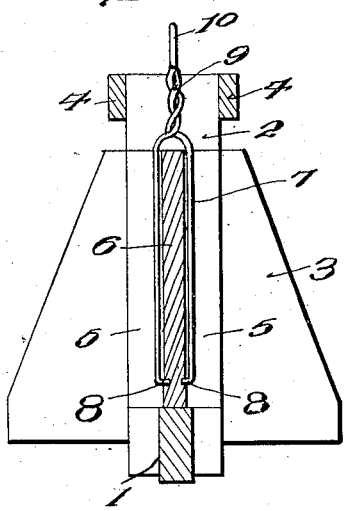
Inventor
W. J. Swords

UNITED STATES PATENT OFFICE.

WILLIAM J. SWORDS, OF CARLTON, COLORADO.

HEAD-GATE.

No. 889,272.  Specification of Letters Patent.  Patented June 2, 1908.

Application filed September 30, 1907. Serial No. 395,248.

*To all whom it may concern:*

Be it known that I, WILLIAM J. SWORDS, citizen of the United States, residing at Carlton, in the county of Prowers and State of Colorado, have invented certain new and useful Improvements in Head-Gates, of which the following is a specification.

This invention has for its object a simple, durable and efficient construction of head gate designed particularly for controlling the flow of water from the main line to a lateral of an irrigating system, and the invention consists in certain constructions and arrangements of parts that I shall hereinafter fully describe and claim.

For a full understanding of the invention reference is to be had to the following description and accompanying drawing, in which:

Figure 1 is a perspective view of my improved head gate. Fig. 2 is a front elevation thereof, partly broken away and partly in section. Fig. 3 is a transverse sectional view.

Corresponding and like parts are referred to in the following description and indicated in all the views of the drawings by the same reference characters.

The frame work of my improved head gate, which may be located at any desired point and which is intended to extend across an irrigating ditch at a lateral thereof or at any other desired point, comprises a lower transversely extending sill 1, uprights or standards 2 secured to and extending upwardly from said sill, bearing plates 3 which are secured to and project outwardly from the standards, as shown, so as to assist in supporting the device in a rigid or stable condition, and spaced upper longitudinal bars 4 secured at their ends to the uprights or standards 2. The inner sides of the standards 2 are provided with spaced parallel guide bars 5 between which the gate proper 6 is mounted to move vertically so as to shut off communication between the main line or lateral or establish such communication.

The devices for raising the gate 6 whenever desired are two in number and may be formed of sufficiently strong wire rods, formed with members 7 embracing the gate 6, and the ends thereof are formed with inwardly bent extremities or spurs 8 penetrating the gate so as to attach the raising devices thereto. Preferably this attachment is a pivotal one. The wire rods of which the gate raising devices are preferably formed are preferably twisted together at intermediate portions near the upper edge of the gate as indicated at 9, and above said twisted portions, the raising devices are formed with transversely elongated loops 10 forming convenient hand holds by which the gate may be drawn upwardly to the desired position.

From the foregoing description in connection with the accompanying drawing it will be seen that I have devised a very durable, efficient and simple construction of head gate for the uses hereinbefore set forth and for other uses generally where a device of this character may be installed and that the head gate may be very cheaply constructed and easily placed in position for use.

Having thus described the invention, what is claimed as new is:

A head gate of the character described, embodying a supporting frame work, vertically extending guide bars, a gate proper mounted to move between said bars, and raising devices for said gate, said devices each consisting of members embracing the gate near the ends thereof and formed with inwardly bent extremities penetrating the gate, each raising device being provided above the gate with a transversely elongated loop forming a hand hold.

In testimony whereof I affix my signature in presence of two witnesses.

WILLIAM J. SWORDS. [L. S.]

Witnesses:
H. F. DECKER,
J. S. MAYFIELD.